Feb. 27, 1968    T. H. FRANCIS    3,370,446
LOCKING DEVICE FOR MOBILE TRANSCEIVERS AND THE LIKE
Filed Oct. 22, 1965

INVENTOR.
THOMAS H. FRANCIS

# United States Patent Office 3,370,446
Patented Feb. 27, 1968

3,370,446
LOCKING DEVICE FOR MOBILE TRANSCEIVERS
AND THE LIKE
Thomas H. Francis, 2101 Madison Ave.,
New York, N.Y. 10037
Filed Oct. 22, 1965, Ser. No. 502,050
3 Claims. (Cl. 70—58)

ABSTRACT OF THE DISCLOSURE

A locking device for securing two-way radios in motor vehicles having a channel member for receiving the radio mounting screw, a lock with an advancing pin which prevents tampering with the mounting screw of the radio, the key of the lock permitting only the user to remove the radio or other device from the vehicle.

The present invention relates to locking devices and, briefly described, comprises a means for effectively preventing the surreptitious removal of mobile electronic instruments from automotive vehicles.

Aside from the ordinary car radio, other and more expensive mobile electronic instruments, such as citizens-band transceivers, tape-players and the like, first used on emergency vehicles and then in commercial transport, are now being installed in cars of the motoring public.

The present method of supporting an instrument of the character described in a motor vehicle is to mount it upon a pair of axially aligned screws extending through apertures in the depending arms of an inverted U-shaped dashboard-mounted bracket and threaded into opposing end faces of the instrument. No provision is made, however, against theft and all that is required in removing an instrument from its mounting is to retract the supporting screws.

To prevent theft of an instrument mounted as and by the means just above described is, therefore, the main object of this invention.

Another object of the invention is to accomplish the just above named objective by the provision of a pair of simple, inexpensive and practical locking devices readily attachable one to each arm of the supporting bracket without necessitating any alterations of the latter.

And, still another object of the invention is to include in each such locking attachment a manually controlled key actuated bolt operable only by means and in a manner as will be explained.

With the bracket screws and bolts of the locking attachments in relative operative positions, these screws are housed by the structure and arrangement of parts in such a manner as to prevent withdrawal of the said bolts by any means other than manipulation of the key as stated, and to accomplish this is a still further object of the invention.

To these and other ends the invention consists of certain parts and combinations of parts as will be fully set forth in the following detailed description.

The accompanying drawings illustrating a preferred embodiment of the invention are as follows.

Figure 1:
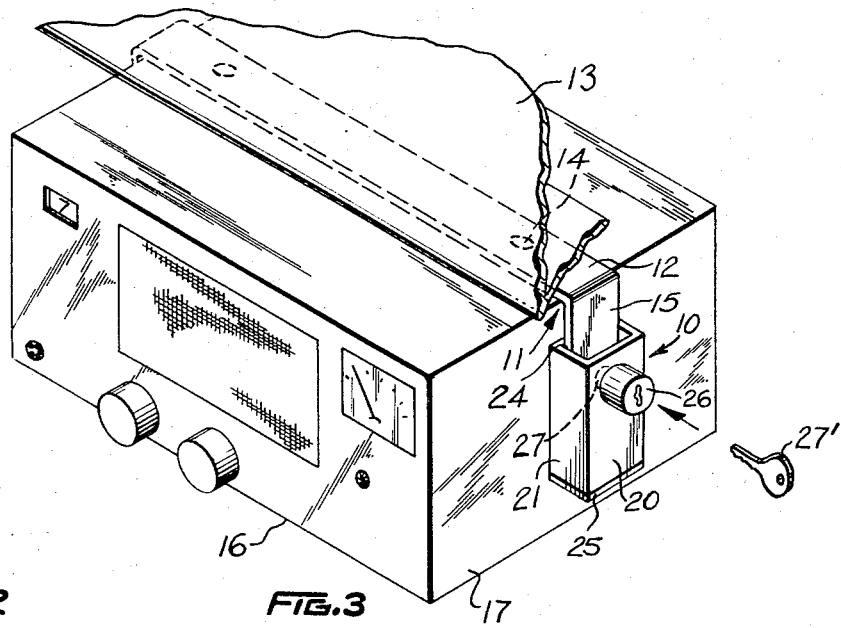
FIGURE 1 is a perspective view of the invention in operative use.
Figure 2:
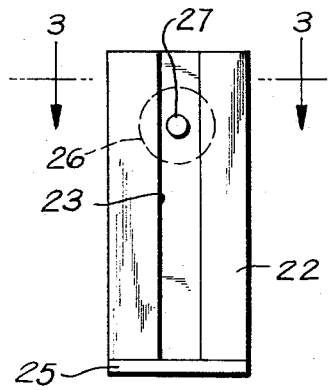
FIGURE 2 is a face view of the invention as shown in elevation, the face seen being that adjacent the instrument mounting bracket of FIGURE 1.
Figure 3:
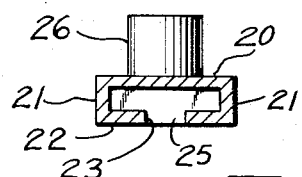
FIGURE 3 is a sectional view on line 3—3 of FIGURE 2 looking in the direction of the arrows.
Figure 4:
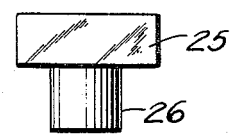
FIGURE 4 is an end view of the attachment as seen from the bottom of FIGURE 2.
Figure 5:
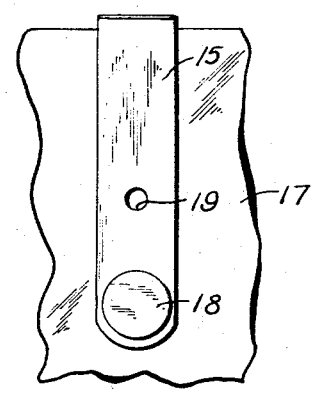
FIGURE 5 is a face view of the instrument supporting bracket arm seen in FIGURE 1 and shows in outer end view the screw associated therewith, a fragmentary adjacent end portion of the mounted instrument also being shown.
Figure 6:
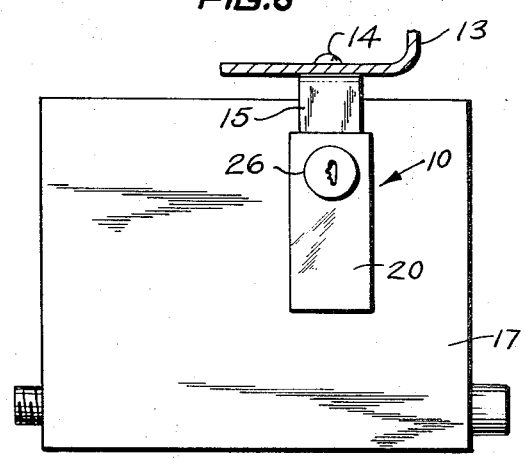
FIGURE 6 is a view in elevation showing the similar locking device in operative position at the opposite end of the supporting bracket from that of FIGURE 1.

The pair of locking devices being similar in construction a description of but one of them will suffice, it being further understood that the drawings are for the purpose of illustration only and that such changes may be made as do not depart from the spirit and scope of the invention as set forth in the specification and defined in the appended claims.

In the drawings similar reference numerals refer to similar parts throughout the several views.

At 17, 17 are like opposing end faces of an instrument to be supported, the one shown at 16 representing a mobile transceiver or the like. Straddling the end faces 17, and slightly cleared therefrom, are the arms 15, 15 of an inverted U-shaped bracket 11, the connecting body portion 12 of which is, in this instance, rigidly attached by screws 14 to a laterally turned portion of the vehicle dashboard 13.

Adjacent the lower ends of the bracket arms 15, 15 are a pair of axially aligned thumbscrews 18, 18 extending through the arms and threaded into the end faces of the instrument 16, these screws preferably having circular, flat heads.

The locking device per se comprises an elongated and substantially rectangular, in cross section, chambered housing or body member 10 having side walls 21, 21, an outer wall 20, a bottom 25, an inner wall 22 and an open top 24, the said inner wall 22 having a median slot 23 therethrough and extending from the top 24 to but not through the bottom 25.

Integral with the body member 10 is a manually controlled key actuated lock 26 provided with a reciprocal, axially extending bolt 27.

Functioning of the locking device and its removable attachment to an instrument supporting bracket 11 are as follows:

The thumbscrew 18 is tightened to bind respective bracket arm 15 to the adjacent end face 17 of the instrument 16. Locking device member 10 is then slipped upwardly onto its respective arm 15 of bracket 11 with its slotted inner wall 22 in slidable engagement with the arm 15 and the bolt 27 carried by the housing 10, and at this time in retracted position, moving to a point above the head of screw 18. This arm 15 and the head end of screw 18 thus lie within the chamber of body member 10 with the shank of the screw projecting through slot 23 of the wall 22. Thereafter, insertion of key 27' (see FIG. 1) into lock 26, and turning the key, projects the bolt 27 forwardly above the peripheral edge of the head of screw 18 to the arm 15. If desired an aperture 19 may be provided through the arm 15 in axial alignment with and to receive the forward end of bolt 27. From the foregoing it will be observed that relative longitudinal movement of the arm 15 and body 10 of the housing to separate such two members will be prevented by the bolt 27, in locking position, functioning as a stop by engaging transversely the peripheral edge of the flat head of bolt 18.

Turning the key 27' to retract the bolt 27 is the only means by which the locking device may be unlocked and thus permit the instrument 16 to be removed from its supporting bracket 11.

In conclusion it may be stated that the instant invention provides a timely and invaluable locking means for the purpose intended; that it is of simple construction and inexpensive to manufacture; and, that it is fool-proof in that, when locked, the instrument supporting screws 18 cannot be reached for retraction by hand, nor in an attempt to manipulate such screws, can an instrument of any sort be successfully inserted into the body member 10 from either the top or bottom thereof. In other words, the heads of the instrument supporting screws 18 are completely and safely housed by the locking device.

What I claim is:

1. The combination with a locking device comprising an elongated housing including side walls, a bottom and open at the top, one of said side walls having a median slot therethrough from its top to said bottom, a key actuated lock integral with the said housing and a reciprocal bolt in said lock, of a bar member endwise insertable in the open end of said housing in slidable engagement with the said slotted wall, and a headed thumb screw axially movable through said bar with its head within said housing and its body portion projecting through said slot, wherein longitudinal movement of said bar is fixed relative to said screw, separation of said housing and said arm one from the other being prevented, with said bolt in projected position, by crosswise engagement of the said bolt as a stop against the peripheral edge of the head of said screw.

2. The combination according to claim 1 characterized by said bar having an aperture for receiving the end of said bolt when the latter is projected to the locking position.

3. In combination, with the supporting means of a mobile electronic instrument in a motor vehicle, the said supporting means comprising an inverted U-shaped bracket the elongated body portion of which is rigidly attached to the dashboard of the vehicle with the arms depending from such connecting portion, one of a pair of opposing axially aligned headed thumbscrews extending through each arm, the head of each screw being adjacent the free end of each arm, each screw being threaded into its respective end face of the supported instrument clamping the arm thereto; a pair of locking attachments to said arms completely housing the heads of said screws, each such attachment comprising: an elongated chambered body member including side walls, a bottom and open at the top into which the free end of the respective one of said arms is inserted, one of said side walls having a median slot therethrough extending from said open top to the bottom of said chamber and in which slot the body of the screw in the arm is slidable, a lock integral with the said body member and a reciprocal bolt in said lock relative longitudinal movement of said arm and said body member to separate one from the other being prevented, with said bolt in projected position, by engagement of said bolt with an opposing stopping means carried by the said arm.

References Cited
UNITED STATES PATENTS

| | | | |
|---|---|---|---|
| 2,055,907 | 9/1936 | Menchen | 70—14 |
| 2,996,909 | 8/1961 | Raye | 70—57 |
| 3,087,118 | 4/1963 | Goffstein | 248—27 X |
| 3,124,949 | 3/1964 | Friedman | 70—14 |

FOREIGN PATENTS 72,156   5/1947   Norway.

MARVIN A. CHAMPION, *Primary Examiner.*

BOBBY R. GAY, *Examiner.*

PERRY TEITELBAUM, *Assistant Examiner.*